US012570574B2

(12) United States Patent
Yamazaki

(10) Patent No.: US 12,570,574 B2
(45) Date of Patent: Mar. 10, 2026

(54) GLASS COMPOSITION AND COMPOSITE POWDER MATERIAL

(71) Applicant: AGC INC., Tokyo (JP)

(72) Inventor: Masahiro Yamazaki, Fukushima (JP)

(73) Assignee: AGC INC., Tokyo (JP)

( * ) Notice: Subject to any disclaimer, the term of this patent is extended or adjusted under 35 U.S.C. 154(b) by 838 days.

(21) Appl. No.: 17/814,982

(22) Filed: Jul. 26, 2022

(65) Prior Publication Data

US 2022/0363590 A1     Nov. 17, 2022

Related U.S. Application Data

(63) Continuation of application No. PCT/JP2021/001923, filed on Jan. 20, 2021.

(30) Foreign Application Priority Data

Jan. 28, 2020     (JP) ................................. 2020-011937

(51) Int. Cl.
*C03C 14/00*          (2006.01)
*C03C 3/091*          (2006.01)
*C03C 12/00*          (2006.01)

(52) U.S. Cl.
CPC ............ *C03C 14/004* (2013.01); *C03C 3/091* (2013.01); *C03C 12/00* (2013.01); *C03C 2214/04* (2013.01)

(58) Field of Classification Search
CPC ............................. C03C 3/091; C03C 2214/20
See application file for complete search history.

(56) References Cited

U.S. PATENT DOCUMENTS

2003/0170436 A1     9/2003  Sumi et al.
2006/0083930 A1     4/2006  Sumi et al.

FOREIGN PATENT DOCUMENTS

| EP | 0 672 633 A1 | 9/1995 | |
| JP | 4047050 B2 | 2/2008 | |
| JP | 2010-6690 A | 1/2010 | |
| JP | 2010-531287 A | 9/2010 | |
| TW | 261603 B | 11/1995 | |
| WO | WO-2009057878 A1 * | 5/2009 | ............... C03C 8/04 |

OTHER PUBLICATIONS

International Search Report issued Mar. 30, 2021 in PCT/JP2021/001923, filed on Jan. 20, 2021, 2 pages.
Qilong et al., "Power Basket Porcelain Materials and Devices", China Railway Publishing House, 1st Edition, Dec. 31, 2017, pp. 184-185 (total 8 pages) (with unedited computer-generated English Translation).

* cited by examiner

*Primary Examiner* — Cameron K Miller
(74) *Attorney, Agent, or Firm* — Oblon, McClelland, Maier & Neustadt, L.L.P.

(57) ABSTRACT

The present invention relates to a glass composition including: $Li_2O$; and, as represented by mol % based on oxides, from 60% to 67% of $SiO$; from 20% to 29% of $B_2O_3$; from 3% to 9% of $CaO$; and from 3% to 6% of $Al_2O_3$, in which a molar ratio ($Li_2O:Na_2O:K_2O$) among a $Li_2O$ content, a $Na_2O$ content, and a $K_2O$ content is 1:(0-1.9):(0-0.9).

10 Claims, No Drawings

GLASS COMPOSITION AND COMPOSITE POWDER MATERIAL

CROSS-REFERENCE TO RELATED APPLICATIONS

This is a continuation of International Application No. PCT/JP2021/001923 filed on Jan. 20, 2021, and claims priority from Japanese Patent Application No. 2020-011937 filed on Jan. 28, 2020, the entire content of which is incorporated herein by reference.

TECHNICAL FIELD

The present invention relates to a glass composition and a composite powder material including a powder including the glass composition.

BACKGROUND ART

Known is a low-temperature co-fired ceramic (LTCC) produced by stacking and firing sheets obtained by dispersing a mixture (composite powder material) of a glass fit and an inorganic oxide in a resin. Such LTCCs are required to be reduced in the permittivity of the material itself for various purposes including the purposes of reducing the interlayer thickness to attain a size reduction, reducing the wiring-to-wiring distance to attain densification, and enhancing functions. Furthermore, there is a desire for a material having a low dielectric loss especially in a microwave range, as a material for enabling communication devices, such as cell phones and smartphones, to conform to the fifth-generation communication standards (commonly called 5G).

For example, Patent Document 1 discloses a borosilicate glass and alumina mixture having a low alkali metal oxide content. Patent Document 1 states that the mixture is sintered at 950° C. for 2 hours to thereby attain a permittivity of 5.7 or less and a dielectric loss of 0.0014 or less in a high-frequency range.

CITATION LIST

Patent Literature

Patent Document 1: Japanese Patent No. 4047050

SUMMARY OF INVENTION

Technical Problem

Used as electrode members for LTCCs are metals having low electrical resistance, such as gold, silver, and copper, and silver electrodes are generally used most widely. As firing temperatures in producing LTCCs, temperatures suitable for the sufficient progress of firing are selected in accordance with the thermal properties of the glass component contained in the composite powder material, such as glass transition temperature Tg, softening point Ts, and crystallization temperature Tc. Usually, the firing temperature is higher than 900° C. However, in the case where the firing temperature is higher than 900° C., silver diffuses into the glass ceramic (fired body) to reduce the electrical properties of the material or browns portions surrounding the silver electrode through oxidation-reduction. The diffusion of silver is inhibited to some degree by a lower firing temperature or shortening the firing time. However, the conventional material, when fired under those conditions described above, cannot give a dense fired body, resulting in reduced electrical properties. There is hence a desire for a material which can be fired at a temperature of 900° C. or lower, more preferably at a temperature of about 870° C., and which attains required electrical properties.

Meanwhile, in the case of using copper as electrodes, diffusion into the glass ceramic is less apt to occur. However, some of the copper oxidizes to copper oxide during firing, resulting in an increase in electrical resistance and a decrease in performance. Because of this, the firing needs to be conducted in an oxygen-free reducing atmosphere. Such firing in a reducing atmosphere necessitates large-scale production equipment, making mass production not easy.

In the method described in Patent Document 1, a low permittivity and a low dielectric loss are attained through firing at 950° C. However, at that firing temperature, silver electrodes cannot be used, and it is necessary to prepare large-scale production equipment to use copper electrodes. Hence, an increased mass-production cost results.

An object of the present invention, which has been achieved in view of those problems, is to provide a glass composition for use in a composite powder material which can be fired at such low temperatures that silver electrodes are usable as well and which gives a fired body that can have a low permittivity and a low dielectric loss in a high-frequency range.

Specifically, the expression "firing of a composite powder material at a low temperature" is intended to mean firing at 870° C. or homogeneous firing at low temperatures in the wide range of from 870° C. to 900° C. The term "low permittivity" is intended to mean a permittivity of 6.5 or less. The term "low dielectric loss" is intended to mean that a Q value, which is the reciprocal of dielectric loss, is 500 or larger when the measuring frequency is 1 MHz, and is 450 or larger when the measuring frequency is from 14 GHz to 16 GHz.

Another object of the present invention is to provide a composite powder material which includes the glass composition as a powder and has those properties.

Solution to Problem

As a result of intensive studies, the present inventors have found that by using a glass composition having a given compositions, firing at a temperature of 900° C. or lower can be achieved and a low permittivity and a low dielectric loss in a high-frequency range can be attained, and the present invention has been accomplished based on this finding.

[1] A glass composition including:
  $Li_2O$; and,
  as represented by mol % based on oxides,
  from 60% to 67% of $SiO$;
  from 20% to 29% of $B_2O_3$;
  from 3% to 9% of CaO; and
  from 3% to 6% of $Al_2O_3$,
  in which a molar ratio ($Li_2O$:$Na_2O$:$K_2O$) among a $Li_2O$ content, a $Na_2O$ content, and a $K_2O$ content is 1:(0-1.9):(0-0.9).

[2] The glass composition according to [1], which has a total content of $Li_2O$, $Na_2O$, and $K_2O$, as represented by mol % based on oxides, of from 0.3% to 1.0%.

[3] The glass composition according to [1] or [2], which has a shrinkage initiation temperature of 790° C. or higher.

[4] The glass composition according to any one of [1] to [3], which has a softening point of 900° C. or lower.

[5] The glass composition according to any one of [1] to [4], which has the $Li_2O$ content, as represented by mol % based on oxides, of from 0.2% to 1.0%.

[6] A composite powder material including from 45 mass % to 55 mass % of a glass powder and from 45 mass % to 55 mass % of alumina filler, in which the glass powder is a powder including the glass composition according to any one of [1] to [5].

[7] The composite powder material according to [6], which has a glass transition temperature of 650° C. or higher.

[8] The composite powder material according to [6] or [7], which has a shrinkage initiation temperature of 820° C. or higher.

[9] The composite powder material according to any one of [6] to [8], which has a softening point of 900° C. or lower.

[10] The composite powder material according to any one of [6] to [9], in which when a fired body obtained by firing the composite powder material at 870° C. for 20 minutes is referred to as a fired body (A) and a fired body obtained by firing the composite powder material at 870° C. for 60 minutes is referred to as a fired body (B), a proportion represented by {[a density of the fired body (B)]/[a density of the fired body (A)]}×100 is from 98.0% to 102.0%.

[11] The composite powder material according to any one of [6] to [10], in which when a fired body obtained by firing the composite powder material at 870° C. for 60 minutes is referred to as a fired body (B) and a fired body obtained by firing the composite powder material at 900° C. for 60 minutes is referred to as a fired body (C), a proportion represented by {[a density of the fired body (B)]/[a density of the fired body (C)]}×100 is from 99.0% to 101.0%.

Advantageous Effects of Invention

The composite powder material including a glass powder including the glass composition according to the present invention can be fired at a temperature as low as 870° C. or can be homogeneously fired at low temperatures in the wide range of from 870° C. to 900° C. A fired body obtained by firing this composite powder material can have a low permittivity and a low dielectric loss even in a high-frequency range.

Embodiments of the present invention are described below. The present invention is not limited to the embodiments described below.

[Glass Composition]

First, an embodiment of the glass composition of the present invention is described. The glass composition according to the present embodiment is a glass composition which includes, as represented by mol % based on oxides, from 60% to 67% of $SiO_2$, from 20% to 29% of $B_2O_3$, from 3% to 9% of CaO, and from 3% to 6% of $Al_2O_3$ and further includes $Li_2O$, and in which a molar ratio ($Li_2O:Na_2O:K_2O$) among a $Li_2O$ content, a $Na_2O$ content, and a $K_2O$ content is 1:(0-1.9):(0-0.9).

The glass composition in the glass composition according to the present embodiment is explained below. In this description, the content of each component in the glass composition is given as represented by mol % based on oxides unless otherwise indicated.

$SiO_2$ is a component for stabilizing the glass and is an essential component.

From the standpoint of making the glass stable and have a reduced permittivity, the $SiO_2$ content of the glass composition according to the present embodiment is 60% or higher, preferably 62% or higher, more preferably 63% or higher.

Meanwhile, from the standpoint of ensuring glass meltability to enable a homogeneous glass to be produced at low cost, the $SiO_2$ content of the glass composition according to the present embodiment is 67% or less, preferably 66.5% or less, more preferably 66% or less.

$B_2O_3$ is a component for accelerating glass firing and is an essential component.

From the standpoint of ensuring sinterability at temperature of 900° C. and lower, the $B_2O_3$ content of the glass composition according to the present embodiment is 20% or higher, preferably 23% or higher, more preferably 24% or higher.

Meanwhile, from the standpoint of preventing the glass in a molten state from suffering phase separation, the $B_2O_3$ content of the glass composition according to the present embodiment is 29% or less, preferably 27% or less, more preferably 26% or less. Glasses susceptible to phase separation are unsuitable for stable mass production.

$Al_2O_3$ is a component for stabilizing the glass and is an essential component.

From the standpoint of preventing the glass from suffering phase separation, the $Al_2O_3$ content of the glass composition according to the present embodiment is 3% or higher, preferably 3.5% or higher, more preferably 4% or higher.

Meanwhile, from the standpoint of inhibiting the glass from having an increased melting temperature, the $Al_2O_3$ content of the glass composition according to the present embodiment is 6% or less, preferably 5.7% or less, more preferably 5.5% or less. Glasses having too high melting temperature are unsuitable for mass production.

CaO is a component for lowering the melting temperature of the glass and accelerating firing and is an essential component.

From the standpoint of ensuring sinterability at temperature of 900° C. and lower, the CaO content of the glass composition according to the present embodiment is 3% or higher, preferably 3.5% or higher, more preferably 4% or higher.

Meanwhile, from the standpoint of attaining a lower permittivity, the CaO content of the glass composition according to the present embodiment is 9% or less, preferably 7% or less, more preferably 6% or less.

$Li_2O$, $Na_2O$, and $K_2O$ are components which accelerate firing and are useful for ensuring sinterability at temperature of 900° C. and lower. Meanwhile, $Li_2O$, $Na_2O$, and $K_2O$ are also components which are prone to heighten the dielectric loss in the high-frequency range. The present inventors repeated experiments and have discovered that in the case where the proportions of the contents of these components satisfy a given requirement, not only a firing-accelerating effect is obtained but also the dielectric loss can be inhibited from increasing.

On the basis of the finding, the molar ratio ($Li_2O:Na_2O:K_2O$) among the contents of $Li_2O$, $Na_2O$, and $K_2O$ is regulated to 1:(0-1.9):(0-0.9).

That is, the glass composition according to the present embodiment contains $Li_2O$ as an essential component but may or may not contain $Na_2O$ and $K_2O$.

Especially from the standpoint of inhibiting the dielectric loss in the high frequency range from increasing, it is most preferable that the glass composition according to the present embodiment contains $Li_2O$ as the only alkali metal oxide and contains neither $Na_2O$ nor $K_2O$. Even in the case where the glass composition contains $Na_2O$ and $K_2O$, the content of $Li_2O$, based on the total content of $Li_2O$, $Na_2O$, and $K_2O$, is preferably 35% or higher, more preferably 60% or higher, most preferably 80% or higher.

From the standpoints of especially inhibiting the dielectric loss in the high-frequency range from increasing and of enabling the glass to have a low softening point and be produced easily, the molar ratio (Li$_2$O:Na$_2$O) between the contents of Li$_2$O and Na$_2$O in the glass composition according to the present embodiment is 1:(1.9 or less), more preferably 1:(1.5 or less), still more preferably 1:(1.3 or less). Meanwhile, the molar ratio (Li$_2$O:Na$_2$O) between the contents of Li$_2$O and Na$_2$O in the glass composition according to the present embodiment is preferably 1:(0.6 or larger), more preferably 1:(0.75 or larger), most preferably 1:(0.9 or larger). That is, in the case where the glass composition contains Na$_2$O, the content of Na$_2$O is up to 1.9 times, more preferably up to 1.5 times, still more preferably up to 1.3 times, the content of Li$_2$O. Meanwhile, the content of Na$_2$O, in the case where the glass composition contains Na$_2$O, is preferably at least 0.6 times, more preferably at least 0.75 times, most preferably at least 0.9 times, the content of Li$_2$O.

Especially from the standpoint of inhibiting the dielectric loss in the high-frequency range from increasing, the molar ratio (Li$_2$O:K$_2$O) between the contents of Li$_2$O and K$_2$O in the glass composition according to the present embodiment is 1:(0.9 or less), more preferably 1:(0.7 or less), still more preferably 1:(0.5 or less), especially preferably 1:(0.3 or less). That is, in the case where the glass composition contains K$_2$O, the content of K$_2$O is up to 0.9 times, more preferably up to 0.7 times, still more preferably up to 0.5 times, especially preferably up to 0.3 times, the content of Li$_2$O.

From the standpoint of lowering the dielectric loss in the high-frequency range, the molar ratio (Na$_2$O:K$_2$O) between the contents of Na$_2$O and K$_2$O in the glass composition according to the present embodiment is preferably 1:(1 or less), more preferably 1:(0.5 or less), still more preferably 1:(0.3 or less), especially preferably 1:(0.25 or less). The glass composition may not contain K$_2$O. In the case where the glass composition contains K$_2$O, that molar ratio is preferably 1:(0.1 or larger). That is, the content of K$_2$O is preferably up to 1 time, more preferably up to 0.5 times, still more preferably up to 0.3 times, especially preferably up to 0.25 times, the content of Na$_2$O, and is preferably at least 0.1 time the content of Na$_2$O.

From the standpoint of improving the sinterability, the total content of Li$_2$O, Na$_2$O, and K$_2$O in the glass composition according to the present embodiment is preferably 0.3% or higher, more preferably 0.4% or higher, still more preferably 0.5% or higher.

Meanwhile, from the standpoint of lowering the dielectric loss in the high-frequency range, the total content of Li$_2$O, Na$_2$O, and K$_2$O in the glass composition according to the present embodiment is preferably 1.0% or less, more preferably 0.9% or less, still more preferably 0.8% or less.

Of those alkali metal oxides, Li$_2$O is an essential component. The content of Li$_2$O in the glass composition according to the present embodiment is preferably 0.2% or higher, more preferably 0.3% or higher, from the standpoint of improving the sinterability. Meanwhile, from the standpoint of lowering the dielectric loss in the high-frequency range, the content of Li$_2$O is preferably 1.0% or less, more preferably 0.9% or less, still more preferably 0.8% or less.

BaO is a component usable in place of the CaO, and some or all of the CaO can be replaced by BaO. BaO is a component which lowers the melting temperature of the glass and accelerates firing. Although being not an essential component, BaO may be contained in the glass composition according to the present embodiment. From the standpoint of ensuring sinterability at temperatures of 900° C. or lower, the BaO content of the glass composition according to the present embodiment is preferably 3% or higher, more preferably 3.5% or higher, still more preferably 4% or higher.

Meanwhile, from the standpoint of attaining a lower permittivity, the BaO content of the glass composition according to the present embodiment is preferably 9% or less, more preferably 7% or less, still more preferably 6% or less.

SrO is a component usable in place of the CaO, and some or all of the CaO can be replaced by SrO. SrO is a component which lowers the melting temperature of the glass and accelerates firing. Although being not an essential component, SrO may be contained in the glass composition according to the present embodiment. From the standpoint of ensuring sinterability at temperatures of 900° C. or lower, the SrO content of the glass composition according to the present embodiment is preferably 3% or higher, more preferably 3.5% or higher, still more preferably 4% or higher.

Meanwhile, from the standpoint of attaining a lower permittivity, the SrO content of the glass composition according to the present embodiment is preferably 9% or less, more preferably 7% or less, still more preferably 6% or less.

The glass composition may contain all the three of CaO, SrO, and BaO, or any desired one or two kinds thereof may be selected and used. The total content of these components is preferably 3% or higher, more preferably 3.5% or higher, still more preferably 4% or higher.

Meanwhile, from the standpoint of attaining a lower permittivity, the content of those components is preferably 9% or less, more preferably 7% or less, still more preferably 6% or less.

The glass composition according to the present embodiment may contain components other than those described above, in such amounts that the effects of the present invention are produced. For example, the glass according to the present embodiment may contain MgO, ZnO, CeO$_2$, ZrO$_2$, CuO, and AgO. These are mere examples, and other components which the glass composition of the present embodiment can contain are not limited to these.

The total content of the other components which the glass composition can contain is preferably 5% or less, more preferably 3% or less.

Temperature suitable for firing the composite powder material including a glass powder including the glass composition according to the present embodiment depends on the shrinkage initiation temperature Sp and softening point Ts of the glass composition. The shrinkage initiation temperature Sp is a temperature at which the glass composition begins to shrink upon melting and which indicates a third inflection point in differential thermal analysis (DTA).

In the case where the glass composition according to the present embodiment has too low a shrinkage initiation temperature Sp, there is a problem in that when a composite powder material including this glass composition is fired even at a temperature suitable for firing the composite powder material, a resinous component used for slurrying the composite powder material at firing can remain either undecomposed as such or as carbon in the fired body, thereby preventing the formation of a dense fired body. Because of this, the shrinkage initiation temperature Sp of the glass composition is preferably 750° C. or higher, more preferably 770° C. or higher, still more preferably 790° C. or higher. Meanwhile, from the standpoint of lowering the firing temperature of the composite powder material, the shrinkage initiation temperature Sp of the glass composition is preferably 850° C. or lower, more preferably 840° C. or lower, still more preferably 830° C. or lower.

From the same standpoints, the softening point Ts of the glass composition according to the present embodiment is preferably 850° C. or higher, more preferably 860° C. or higher, still more preferably 870° C. or higher. The softening point Ts of the glass composition according to the present embodiment is preferably 920° C. or lower, more preferably 910° C. or lower, still more preferably 900° C. or lower.

Methods for producing the glass composition according to the present embodiment are not particularly limited, and examples thereof include the following method.

First, raw materials are mixed to prepare a raw-material mixture. The raw materials are not particularly limited so long as the raw materials are ones for use in producing ordinary oxide-based glasses, and use can be made of oxides, carbonates, etc. The kinds and proportions of raw materials are suitably regulated so as to obtain a glass having a composition within the range shown above, thereby obtaining the raw-material mixture.

Next, the raw-material mixture is heated by a known method to obtain a melt. The temperature (melting temperature) at which the raw-material mixture is heated is preferably 1,500° C. or higher, more preferably 1,550° C. or higher, and is preferably 1,700° C. or lower, more preferably 1,650° C. or lower. The time of the heating is preferably 90 minutes or longer, more preferably 100 minutes or longer, and is preferably 180 minutes or less, more preferably 140 minutes or less.

Thereafter, the melt is cooled to solidification, thereby obtaining the glass composition according to the present embodiment. Methods for the cooling are not particularly limited. For example, the melt can be cooled with a rolling-out machine, a pressing machine, or the like, or can be rapidly cooled, for example, by dropping into a cooling liquid.

The thus-obtained glass composition according to the present embodiment may be in any form. For example, the glass composition may be in the shape of a block, a plate, thin sheets (flakes), a powder, etc.

[Composite Powder Material]

Next, a composite powder material according to the present embodiment is explained. The composite powder material according to the present embodiment preferably includes from 45 mass % to 55 mass % of a glass powder including the glass composition and from 45 mass % to 55 mass % of alumina filler.

The glass powder included in the composite powder material according to the present embodiment is a glass powder including the glass composition.

In the case where the content of the glass powder in the composite powder material according to this embodiment is 45 mass % or higher, the composite powder material can have sufficient sinterability at temperatures of 900° C. or lower. Consequently, the content of the glass powder in the composite powder material according to the present embodiment is preferably 45 mass % or higher, more preferably 47 mass % or higher, still more preferably 48 mass % or higher.

Meanwhile, in the case where the content of the glass powder in the composite powder material according to the present embodiment is 55 mass % or less, the composite powder material can contain a sufficient amount of the alumina filler which will be described later, making it possible to obtain a sufficiently low dielectric loss in the high-frequency range. Consequently, the content of the glass powder in the composite powder material according to the present embodiment is preferably 55 mass % or less, more preferably 53 mass % or less, still more preferably 51 mass % or less.

The glass powder in the present embodiment has an average particle diameter D50 of preferably 5 μm or less, more preferably 4 μm or less, still more preferably 3 μm or less, from the standpoint of obtaining dense fired bodies through firing.

Meanwhile, glass powders having too small average particle diameters D50 are high in production cost when produced industrially. Consequently, the average particle diameter D50 of the glass powder in the present embodiment is preferably 0.5 μm or larger, more preferably 0.8 μm or larger, still more preferably 1.5 μm or larger.

In a volume-based cumulative particle size distribution curve determined by laser diffractometry, the particle diameter which has an integrated amount of 50% accumulation from the minimum particle size is referred to as "average particle diameter D50".

The alumina filler is a component which lowers dielectric loss in the high-frequency range. In the case where the content of the alumina filler in the composite powder according to the present embodiment is 45 mass % or higher, a sufficiently low dielectric loss in the high-frequency range is obtained. Consequently, the content of the alumina filler in the composite powder material according to the present embodiment is preferably 45 mass % or higher, more preferably 47 mass % or higher, still more preferably 49 mass % or higher.

Meanwhile, in the case where the content of the alumina filler in the composite powder material according to the present embodiment is 55 mass % or less, the composite powder material can have sufficient sinterability at temperatures of 900° C. or lower. Consequently, the content of the alumina filler in the composite powder material according to the present embodiment is preferably 55 mass % or less, more preferably 53 mass % or less, still more preferably 52 mass % or less.

The average particle diameter D50 of the alumina filler in the present embodiment is preferably 5 μm or less, more preferably 4 μm or less, still more preferably 3 μm or less, from the standpoints of obtaining sufficiently dense fired bodies through firing, obtaining fired bodies having improved surface smoothness, and attaining a further reduction in dielectric loss in the high-frequency range.

Meanwhile, from the standpoint of improving the bending strength, the average particle diameter D50 of the alumina filler in the present embodiment is preferably 0.3 μm or larger, more preferably 0.6 μm or larger, still more preferably 1.5 μm or larger.

The higher the purity of the alumina filler in the present embodiment, the more the alumina filler is preferred. Specifically, the $Al_2O_3$ content of the alumina filler in the present embodiment is preferably 99.5 mass % or higher, more preferably 99.9 mass % or higher, still more preferably 99.99 mass % or higher.

In some alumina fillers, the $Al_2O_3$ has a plurality of crystal structures. However, from the standpoint of lowering dielectric loss, the alumina filler in the present embodiment preferably includes corundum crystals in a large amount. In the alumina filler in the present embodiment, the proportion of corundum crystals to all the crystalline components is preferably 30 mass % or higher, more preferably 50 mass % or higher, still more preferably 75 mass % or higher, most preferably 100 mass %.

The proportion can be determined by X-ray crystal structure analysis.

The composite powder material according to the present embodiment may further contain an inorganic-oxide filler other than alumina filler. Examples of the inorganic-oxide filler other than alumina filler include a magnesia filler.

The magnesia filler is a component having the effect of preventing the glass powder having low water resistance from causing the precipitation of orthoboric acid after the composite powder material has been formed into a green sheet. In the case where orthoboric acid has precipitated on the surfaces of the green sheet, a bonding failure may be caused at stacked-layer interfaces after stacking and firing, resulting in troubles such as separation, cracking, etc. The precipitation of orthoboric acid can be prevented not only by adding a magnesia filler but also by a method such as, for example, keeping the green sheet in a low-temperature and low-humidity environment or shortening the storage period. Because of this, the magnesia filler is not an essential component in the composite powder material according to the present embodiment.

In the case where the effect of preventing the precipitation of orthoboric acid is desired to be obtained by adding a magnesia filler, the content of the magnesia filler is preferably 0.3 mass % or higher, more preferably 0.5 mass % or higher, still more preferably 0.8 mass % or higher.

Meanwhile, in the case where the content of the magnesia filler is too high, this composite powder material may have insufficient sinterability at temperatures of 900° C. or lower. Consequently, the magnesia filler content in the composite powder material according to the present embodiment is preferably 5 mass % or less, more preferably 3 mass % or less, still more preferably 1.5 mass % or less.

Examples of the inorganic-oxide filler other than alumina filler include the following fillers besides the magnesia filler: steatite, forsterite, cordierite, willemite, fused quartz, cerium oxide, zirconium oxide, copper oxide, silver oxide, or the like.

The composite powder material according to the present embodiment may contain components other than those described above, in such amounts that the effects of the present invention are produced. For example, the composite powder material according to the present embodiment may contain a glass frit, which functions as a firing aid, or lithium carbonate, sodium carbonate, potassium carbonate, calcium carbonate, barium carbonate, strontium carbonate, boric anhydride, aluminum hydroxide, or the like. The glass fit is a component functioning as a firing aid and is hence different from the glass powder including the glass composition according to the present embodiment. Those components are mere examples, and other components which the composite powder material according to the present embodiment can contain are not limited to those.

The composite powder material according to the present embodiment is obtained by mixing a glass powder including the glass composition with an alumina filler and other components which are added according to need. Methods for the mixing are not particularly limited, and known mixing methods can be employed. Preferred embodiment of the glass composition constituting the glass powder is the same as that of the glass composition described above.

The composite powder material according to the present embodiment is preferably used for obtaining fired bodies, e.g., LTCCs, through firing. Methods for the firing are not particularly limited, and examples thereof include a green-sheet method. The green-sheet method is briefly explained below.

In the green-sheet method, the composite powder material according to the present embodiment is first mixed with a resin. In this mixing, additives such as a plasticizer may be added according to need. Next, the mixture is mixed with a solvent and slurried, and the slurry is formed into a sheet on a film of, for example, poly(ethylene terephthalate). Finally, the sheet-form slurry is dried to remove the solvent, thereby giving a green sheet.

The resin is not particularly limited, and any of resins in common use in the green-sheet method may be used. For example, use can be made of a poly(vinyl butyral) resin, an acrylic resin, or the like.

The plasticizer also is not particularly limited, and any of plasticizers in common use in the green-sheet method may be used. For example, use can be made of dibutyl phthalate, dioctyl phthalate, butyl benzyl phthalate, or the like.

The solvent also is not particularly limited, and any of solvents in common use in the green-sheet method may be used. For example, use can be made of toluene, xylene, butanol, or the like.

Methods for forming the slurry are also not particularly limited. Examples thereof include a doctor blade method.

Wiring patterns, via, which is a through conductor, etc. are formed on the obtained green sheet according to need, for example, by screen printing using a silver paste, silver conductor, etc. An overcoat glass for protecting the silver wiring or the like may be formed by screen printing, etc.

Thereafter, the green sheet, after having been stacked together with other such green sheets according to need, is cut into a desired shape and fired. Thus, a fired body (substrate) is obtained.

The temperature at firing is preferably 900° C. or lower, more preferably 880° C. or lower, still more preferably 870° C. or lower, from the standpoint of inhibiting a decrease in electrical property due to the diffusion of silver during the firing or of inhibiting the browning due to oxidation or reduction. Since the composite powder material according to the present embodiment includes a given amount of the glass powder including the glass composition, which has excellent sinterability, the firing proceeds sufficiently even at such low temperatures.

Meanwhile, the temperature at firing is preferably 850° C. or higher, more preferably 860° C. or higher, from the standpoint of proceeding firing sufficiently.

The time period of firing the composite powder material according to the present embodiment is not particularly limited, and is, for example, about from 20 minutes to 60 minutes.

Temperatures suitable for the firing of the composite powder material according to the present embodiment depend on the glass transition temperature Tg, shrinkage initiation temperature Sp, and softening point Ts of the composite powder material. As described above, the shrinkage initiation temperature Sp is a temperature at which the glass composition begins to shrink upon melting and which indicates a third inflection point in differential thermal analysis (DTA).

In the case where the composite powder material according to the present embodiment has too low a glass transition temperature Tg, there is a problem in that when the composite powder material is fired even at a temperature suitable for firing the composite powder material, a resinous component used for slurrying the composite powder material at firing can remain either undecomposed as such or as carbon in the fired body, thereby preventing the formation of a dense fired body. Because of this, the glass transition temperature Tg of the composite powder material according to the present embodiment is preferably 650° C. or higher, more preferably 665° C. or higher, still more preferably 680°

C. or higher. Meanwhile, from the standpoint of lowering the firing temperature of the composite powder material, the glass transition temperature Tg of the composite powder material according to the present embodiment is preferably 730° C. or lower, more preferably 715° C. or lower, still more preferably 710° C. or lower.

From the same standpoints, the shrinkage initiation temperature Sp of the composite powder material according to the present embodiment is preferably 820° C. or higher, more preferably 830° C. or higher, still more preferably 840° C. or higher. The shrinkage initiation temperature Sp of the composite powder material according to the present embodiment is preferably 880° C. or lower, more preferably 870° C. or lower, still more preferably 860° C. or lower.

From the same standpoints, the softening point Ts of the composite powder material according to the present embodiment is preferably 865° C. or higher, more preferably 870° C. or higher, still more preferably 875° C. or higher. The softening point Ts of the composite powder material according to the present embodiment is preferably 910° C. or lower, more preferably 905° C. or lower, still more preferably 900° C. or lower.

In firing the composite powder material according to the present embodiment, a usual method is to dispose a plurality of stacks of green sheets in a firing furnace and fire the stacks. However, there is a possibility that the stacks might slightly differ in firing temperature depending on the locations thereof in the firing furnace. It is preferable that homogeneous sintered bodies are obtained even when the stacks thus slightly differ in firing temperature.

Consequently, the composite powder material according to the present embodiment preferably satisfies that the ratio (proportion represented by [(the density of the fired body (B))/(the density of the fired body (C))]×100) of the density of a fired body (fired body (B)) obtained by firing the composite powder material at 870° C. for 60 minutes to the density of a fired body (fired body (C)) obtained by firing the composite powder material at 900° C. for 60 minutes is preferably 101.0% or less, more preferably 100.8% or less, still more preferably 100.5% or less, the firing and density determination being made by the methods which will be described in the section EXAMPLES.

That proportion is preferably 99.0% or higher, more preferably 99.2% or higher, still more preferably 99.5% or higher.

From the standpoints of attaining a reduction in production cost and avoiding an increase in equipment scale, the firing temperature is preferably lower and the firing period is preferably shorter.

Consequently, the composite powder material according to the present embodiment preferably satisfies that the ratio (proportion represented by [(the density of the fired body (B))/(the density of the fired body (A))]×100) of the density of the fired body (fired body (B)) obtained by firing the composite powder material at 870° C. for 60 minutes to the density of the fired body (fired body (A)) obtained by firing the composite powder material at 870° C. for 20 minutes is preferably 102.0% or less, more preferably 101.5% or less, still more preferably 101.0% or less, the firing and density determination being made by the methods which will be described in the section EXAMPLES.

That proportion is preferably 98.0% or higher, more preferably 98.5% or higher, still more preferably 99.0% or higher.

The composite powder material according to the present embodiment preferably satisfies that the fired body (fired body (B)) obtained by firing the composite powder material at 870° C. for 60 minutes has a permittivity at 1 MHz of preferably 6.5 or less, more preferably 6.4 or less, still more preferably 6.3 or less, the firing and permittivity determination being made by the methods which will be described in the section EXAMPLES.

In this case, the Q value is preferably 500 or larger, more preferably 2,500 or larger, still more preferably 3,300 or larger.

The meaning of this Q value is explained below.

Since the Q value is the reciprocal of dielectric loss, large Q values mean low dielectric losses. In LTCCs, the lower the permittivity of the material itself, the more the material is preferred, in view of various purposes, e.g., reducing the interlayer thickness to attain a size reduction, reducing the wiring-to-wiring distance to attain densification, and enhancing functions. Green sheets for LTCC with which silver electrodes are generally usable are commercially available from DuPont de Nemours, Inc., Ferro Corp., etc. These green sheets each attains permittivity of about from 7 to 8. It is preferable that the fired body exhibits a permittivity lower by at least 0.5 than this permittivity; such low permittivity has a design significance.

In the case where the Q value is 500 or larger, satisfactory receiving sensitivity and sending sensitivity are attained at frequencies used and the power consumption is not too large. Such Q values are hence preferred.

The composite powder material according to the present embodiment preferably satisfies that the fired body (fired body (C)) obtained by firing the composite powder material at 900° C. for 60 minutes has a permittivity at 1 MHz of preferably 6.5 or less, more preferably 6.4 or less, still more preferably 6.3 or less, the firing and permittivity determination being made by the methods which will be described in the section EXAMPLES. In this case, the Q value is preferably 500 or larger, more preferably 2,500 or larger, still more preferably 3,300 or larger.

The composite powder material according to the present embodiment preferably satisfies that the fired body (fired body (A)) obtained by firing the composite powder material at 870° C. for 20 minutes has a permittivity at 1 MHz of preferably 6.5 or less, more preferably 6.4 or less, still more preferably 6.3 or less, the firing and permittivity determination being made by the methods which will be described in the section EXAMPLES. In this case, the Q value is preferably 500 or larger, more preferably 2,500 or larger, still more preferably 3,300 or larger.

In order for communication devices such as cell phones and smartphones to conform to the fifth-generation communication standards (commonly called 5G), there is a desire for a material having a low dielectric loss especially in a microwave range. The composite powder material according to the present embodiment preferably satisfies that even a fired body (fired body (A)) through firing under the conditions of the firing temperature of 870° C. and a firing time of 20 minutes has a permittivity of preferably 6.5 or less, more preferably 6.4 or less, the firing and permittivity determination being made by the methods which will be described in the section EXAMPLES. In this case, the Q value is preferably 450 or larger, more preferably 470 or larger, most preferably 500 or larger.

In this description, the term "high frequency" means a frequency of 14 GHz or higher. In the frequency range of from 14 GHz to 16 GHz, the permittivity and the Q value preferably satisfy the above ranges.

EXAMPLES

The present invention is explained in detail below using Examples, but the present invention is not limited to the following Examples unless the invention departs from the spirit thereof.

[Production of Glass Compositions]

Raw materials for glass were mixed together in respective amounts so as to result in each of the glass compositions shown in Table 1. The mixtures were melted for 2 hours in an electric furnace of from 1,550° C. to 1,650° C. using platinum crucibles, and the melts were each formed into a thin glass sheet to obtain a glass composition. Thereafter, each glass composition was pulverized with a ball mill to obtain a powder thereof having a D50 of 2.0 μm. Examples 1-1 to 1-4 are Examples according to the present invention, and Examples 1-5 to 1-12 are Comparative Examples.

[Evaluation of the Glass Compositions]

The obtained powders of the glass compositions were each evaluated for shrinkage initiation temperature Sp and softening point Ts using a differential thermal analyzer. The results thereof are shown in Table 1.

compacted under a pressure of 200 MPa, and the resultant compacts were fired at 870° C. for 20 minutes, or at 870° C. for 60 minutes, or at 900° C. for 60 minutes to obtain fired bodies, which were examined for density, permittivity, and Q value. The examinations were made by the following methods, and the results thereof are shown in Table 2. In Table 2, "Fired body (A)" means one obtained through firing at 870° C. for 20 minutes, "Fired body (B)" means one obtained through firing 870° C. for 60 minutes, and "Fired body (C)" means one obtained through firing at 900° C. for 60 minutes.

(Determination of Density)

The density of each of the fired bodies obtained by firing the composite powder materials under each firing conditions was determined by Archimedes' method.

(Determination of Dielectric Properties)

The fired bodies of the composite powder materials were each formed into a given cylindrical shape (having a diameter of 20 mm and a thickness of 3 mm) and examined for dielectric property using an LCR meter (4192A, manufactured by Agilent Inc.) to determine the permittivity and

TABLE 1

| | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Ex. 1-10 | Ex. 1-11 | Ex. 1-12 |
|---|---|---|---|---|---|---|---|---|---|---|---|---|---|
| Glass | $SiO_2$ | 64.61 | 64.61 | 64.61 | 64.61 | 64.61 | 64.61 | 68.89 | 69.41 | 60.93 | 60.93 | 66.53 | 65.00 |
| composition | $B_2O_3$ | 24.85 | 24.85 | 24.85 | 24.85 | 24.85 | 24.85 | 21.77 | 19.27 | 23.46 | 23.46 | 25.62 | 25.00 |
| (mol %) | $Li_2O$ | 0.40 | 0.40 | 0.30 | 0.60 | 0.20 | 0.00 | 0.30 | 0.30 | 0.30 | 0.30 | 0.30 | 0.00 |
| | $Na_2O$ | 0.20 | 0.10 | 0.30 | 0.00 | 0.20 | 0.00 | 0.30 | 0.30 | 0.30 | 0.30 | 0.30 | 0.00 |
| | $K_2O$ | 0.00 | 0.10 | 0.00 | 0.00 | 0.20 | 0.60 | 0.00 | 0.00 | 0.00 | 0.00 | 0.00 | 0.00 |
| | CaO | 4.97 | 4.97 | 4.97 | 4.97 | 4.97 | 4.97 | 4.37 | 5.36 | 10.34 | 4.67 | 5.16 | 5.00 |
| | $Al_2O_3$ | 4.97 | 4.97 | 4.97 | 4.97 | 4.97 | 4.97 | 4.37 | 5.36 | 4.67 | 10.34 | 2.09 | 5.00 |
| | Total | 100.0 | 100.0 | 100.0 | 100.0 | 100.0 | 100.0 | 100.0 | 100.0 | 100.0 | 100.0 | 100.0 | 100.0 |
| Shrinkage initiation temperature Sp(° C.) | | 801 | 819 | 797 | 823 | 786 | 813 | 831 | 843 | 864 | 811 | 797 | 835 |
| Softening point Ts (° C.) | | 886 | 892 | 876 | 890 | 900 | 886 | 904 | 926 | 955 | 936 | 900 | 910 |

[Production of Composite Powder Materials]

Each of the obtained powders of the glass compositions was mixed with an alumina filler (purity of 99.9%; corundum single crystal) and a magnesia filler (purity of 99.9%) in the proportions shown in Table 2, and the mixtures were each mixed for 1 hour using a wet ball mill employing an alcohol solvent and were then filtered for dehydration and dried, thereby obtaining composite powder materials. The composite powder material of Example 2-1 was one obtained using the powder of the glass composition of Example 1-1, and the composite powder materials of Examples 2-2 to 2-12 are ones respectively obtained using the powder of the glass compositions of Examples 1-2 to 1-12. Examples 2-1 to 2-4 are Examples according to the present invention and Examples 2-5 to 2-12 are Comparative Examples.

[Evaluation of the Composite Powder Materials]

The obtained composite powder materials were evaluated for glass transition temperature Tg, shrinkage initiation temperature Sp, and softening point Ts using a differential thermal analyzer. The results thereof are shown in Table 2.

Meanwhile, 3 g of each of the composite powder materials was put in a mold having a diameter of 30 mm and dielectric loss at 20° C. and 1 MHz by a method according to JIS C 2138 (2007). The Q value was calculated as the reciprocal of the dielectric loss.

(Determination of Dielectric Properties in High-Frequency Range)

The composite powder materials of Examples 2-1 to 2-4 and 2-12 were fired at 870° C. for 20 minutes to obtain fired bodies (fired bodies (A)), which were examined for dielectric property in the high-frequency range. The composite powder materials of Examples 2-1 to 2-4 were materials which had given fired bodies (fired bodies (B)) through firing at 870° C. for 20 minutes and fired bodies (fired bodies (C)) through firing at 900° C. for 60 minutes, the fired bodies (B) and (C) having had satisfactory dielectric properties at 1 MHz and had satisfactory values of the proportion of the density of the fired body (B) to the density of the fired body (C).

The dielectric properties in the high-frequency range were determined using a PNA network analyzer N5227A, manufactured by Keysight Technologies, by a method according to JIS R 1627 (1996). The measuring frequencies are shown in Table 2 together with the results.

TABLE 2

| | | | Ex. 2-1 | Ex. 2-2 | Ex. 2-3 | Ex. 2-4 | Ex. 2-5 | Ex. 2-6 |
|---|---|---|---|---|---|---|---|---|
| Composition of composite powder material (mass %) | | Glass composition | 49.5 | 49.5 | 49.5 | 49.5 | 49.5 | 49.5 |
| | | Alumina filler | 49.5 | 49.5 | 49.5 | 49.5 | 49.5 | 49.5 |
| | | Magnesia filer | 1 | 1 | 1 | 1 | 1 | 1 |
| Thermal analysis | | Glass transition temperature Tg (° C.) | 700 | 710 | 682 | 707 | 699 | 709 |
| | | Shrinkage initiation temperature Sp (° C.) | 852 | 850 | 851 | 850 | 861 | 858 |
| | | Softening point Ts (° C.) | 894 | 887 | 885 | 889 | 900 | 905 |
| Density of fired body | Density | Fired body (A): 870° C., 20 min | 2.806 | 2.797 | 2.811 | 2.782 | | |
| | | Fired body (B): 870° C., 60 min | 2.817 | 2.810 | 2.810 | 2.814 | 2.747 | 2.788 |
| | | Fired body (C): 900° C., 60 min | 2.796 | 2.804 | 2.804 | 2.812 | 2.797 | 2.837 |
| | | [(Density of fired body (B))/(density of fired body (A))] × 100 | 100.4% | 100.5% | 100.0% | 101.1% | | |
| | | [(Density of fired body (B))/(density of fired body (C))] × 100 | 100.8% | 100.2% | 100.2% | 100.1% | 98.2% | 98.3% |
| Measuring frequency, 1 MHz | Fired body (A) | Permittivity | 6.03 | 6.03 | 6.22 | 6.17 | | |
| | | Q value | 3,333 | 5,000 | 3,333 | 2,000 | | |
| | Fired body (B) | Permittivity | 6.14 | 6.16 | 6.18 | 6.04 | 6.20 | 6.14 |
| | | Q value | 2,500 | 3,333 | 3,333 | 2,500 | 2,500 | 5,000 |
| | Fired body (C) | Permittivity | 6.15 | 6.19 | 6.17 | 6.06 | 6.10 | 6.26 |
| | | Q value | 3,333 | 5,000 | 3,333 | 3,333 | 10,000 | 1,429 |
| High-frequency measurement | Fired body (A) | Measuring frequency | 14.8 GHz | 14.8 GHz | 14.7 GHz | 14.9 GHz | | |
| | | Permittivity | 5.91 | 5.90 | 5.92 | 5.90 | | |
| | | Q value | 500 | 526 | 500 | 556 | | |

| | | | Ex. 2-7 | Ex. 2-8 | Ex. 2-9 | Ex. 2-10 | Ex. 2-11 | Ex. 2-12 |
|---|---|---|---|---|---|---|---|---|
| Composition of composite powder material (mass %) | | Glass composition | 49.5 | 49.5 | 49.5 | 49.5 | 49.5 | 59.5 |
| | | Alumina filler | 49.5 | 49.5 | 49.5 | 49.5 | 49.5 | 39.5 |
| | | Magnesia filer | 1 | 1 | 1 | 1 | 1 | 1 |
| Thermal analysis | | Glass transition temperature Tg (° C.) | 701 | 759 | 696 | 745 | 743 | 779 |
| | | Shrinkage initiation temperature Sp (° C.) | 859 | 879 | 817 | 870 | 885 | 883 |
| | | Softening point Ts (° C.) | 907 | 925 | 916 | 913 | 927 | 926 |
| Density of fired body | Density | Fired body (A): 870° C., 20 min | | | | | | 2.544 |
| | | Fired body (B): 870° C., 60 min | 2.789 | 2.698 | 2.863 | 2.584 | 2.800 | 2.645 |
| | | Fired body (C): 900° C., 60 min | 2.876 | 2.792 | 2.789 | 2.628 | 2.729 | 2.670 |
| | | [(Density of fired body (B))/(density of fired body (A))] × 100 | | | | | | 104.0% |
| | | [(Density of fired body (B))/(density of fired body (C))] × 100 | 97.0% | 96.6% | 102.7% | 98.3% | 102.6% | 99.1% |
| Measuring frequency, 1 MHz | Fired body (A) | Permittivity | | | | | | |
| | | Q value | | | | | | |
| | Fired body (B) | Permittivity | 5.97 | 5.94 | 6.59 | 9.78 | 6.10 | 5.61 |
| | | Q value | 1,667 | 34 | 1,667 | 3 | 2,500 | 1,667 |
| | Fired body (C) | Permittivity | 6.75 | 6.15 | 6.13 | 6.87 | 5.81 | 5.71 |
| | | Q value | 1,667 | 1,250 | 1,429 | 7 | 1,667 | 3,333 |
| High-frequency measurement | Fired body (A) | Measuring frequency | | | | | | 15.5 GHz |
| | | Permittivity | | | | | | 5.5 |
| | | Q value | | | | | | 67 |

The composite powder materials of Examples 2-1 to 2-4, which included the powders of the glass compositions of Examples 1-1 to 1-4, each satisfied that the fired body (B) obtained by firing the material at 870° C. for 60 minutes and the fired body (C) obtained by firing the material at 900° C. for 60 minutes each had a permittivity at 1 MHz of 6.5 or less and a Q value of 2,500 or larger and that the proportion of the density of the fired body (B) obtained by firing the material at 870° C. for 60 minutes to the density of the fired body (C) obtained by firing the material at 900° C. for 60 minutes was from 99% to 101%. It is deemed therefrom that homogeneous and dense fired bodies were formed at tem-peratures in a wide range. Furthermore, these composite powder materials each satisfied that the proportion of the density of the fired body (B) obtained by firing the material at 870° C. for 60 minutes to the density of the fired body (A) obtained by firing the material at 870° C. for 20 minutes was from 98% to 102% and that the fired body (A) obtained by firing the material at 870° C. for 20 minutes had a permit-tivity of 6.5 or less and a Q value of 500 or larger at a high frequency of about 15 GHz, showing excellent dielectric properties.

Meanwhile, the composite powder materials of Examples 2-5 to 2-12, which included the powders of the glass compositions of Examples 1-5 to 1-12, were inferior in at least one of the permittivity, Q value, and sinterability. Furthermore, with respect to the composite powder material of Example 2-12, which included the powder of the glass composition of Example 1-12, which contained no alkali metal oxide, the proportion of the density of the fired body (B) obtained by firing the material at 870° C. for 60 minutes to the density of the fired body (A) obtained by firing the material at 870° C. for 20 minutes was 104.0%, which was extremely poor, although the composite powder material had an increased proportion of the glass composition and a reduced proportion of the alumina filler. Thus, the composite powder material of Example 2-12 had far poorer sinterability than the Examples according to the present invention. In addition, the fired body (A) obtained by firing this material at 870° C. for 20 minutes had a considerably poor Q value of 67 at a high frequency of about 15 GHz.

While the invention has been described with reference to specific embodiments thereof, the invention is not limited to the embodiments, and various changes and replacements can be made in the embodiments within the scope of the invention.

This application is based on a Japanese patent application 2020-011937 filed on Jan. 28, 2020, the contents thereof being incorporated herein by reference.

The invention claimed is:

1. A composite powder material, comprising:
from 45 mass % to 55 mass % of a glass powder and from 45 mass % to 55 mass % of alumina filler,
wherein the glass powder is a powder comprising:
Li$_2$O; and,
as represented by mol % based on oxides,
from 60% to 67% of SiO;
from 20% to 29% of B$_2$O$_3$;
from 3% to 9% of CaO; and
from 3% to 6% of Al$_2$O$_3$,
wherein a molar ratio (Li$_2$O:Na$_2$O:K$_2$O) among a Li$_2$O content, a Na$_2$O content, and a K$_2$O content is 1:(0-1.9):(0-0.9), and

wherein the glass powder has an average particle diameter of 0.5 μm to 5 μm.

2. The composite powder material according to claim 1, which has a glass transition temperature of 650° C. or higher.

3. The composite powder material according to claim 1, which has a shrinkage initiation temperature of 820° C. or higher.

4. The composite powder material according to claim 1, which has a softening point of 900° C. or lower.

5. The composite powder material according to claim 1, wherein when a fired body obtained by firing the composite powder material at 870° C. for 20 minutes is referred to as a fired body (A) and a fired body obtained by firing the composite powder material at 870° C. for 60 minutes is referred to as a fired body (B), a proportion represented by {[a density of the fired body (B)]/[a density of the fired body (A)]}×100 is from 98.0% to 102.0%.

6. The composite powder material according to claim 1, wherein when a fired body obtained by firing the composite powder material at 870° C. for 60 minutes is referred to as a fired body (B) and a fired body obtained by firing the composite powder material at 900° C. for 60 minutes is referred to as a fired body (C), a proportion represented by {[a density of the fired body (B)]/[a density of the fired body (C)]}×100 is from 99.0% to 101.0%.

7. The composite powder material of claim 1, wherein the glass powder has a total content of Li$_2$O, Na$_2$O, and K$_2$O, as represented by mol % based on oxides, of from 0.3% to 1.0%.

8. The composite powder material of claim 1, wherein the glass powder has a shrinkage initiation temperature of 790° C. or higher.

9. The composite powder material of claim 1, wherein the glass powder has a softening point of 900° C. or lower.

10. The composite powder material of claim 1, wherein the glass powder has a Li$_2$O content, as represented by mol % based on oxides, of from 0.2% to 1.0%.

* * * * *